(12) United States Patent
Shizuku

(10) Patent No.: US 11,795,613 B2
(45) Date of Patent: Oct. 24, 2023

(54) CORD FOR ELASTOMER REINFORCEMENT USE

(71) Applicant: BRIDGESTONE CORPORATION, Tokyo (JP)

(72) Inventor: Takahisa Shizuku, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 310 days.

(21) Appl. No.: 17/287,408

(22) PCT Filed: Oct. 29, 2019

(86) PCT No.: PCT/JP2019/042420
§ 371 (c)(1),
(2) Date: Apr. 21, 2021

(87) PCT Pub. No.: WO2020/090835
PCT Pub. Date: May 7, 2020

(65) Prior Publication Data
US 2021/0394560 A1 Dec. 23, 2021

(30) Foreign Application Priority Data
Oct. 30, 2018 (JP) .................................. 2018-204359

(51) Int. Cl.
*B60C 9/00* (2006.01)
*D07B 1/06* (2006.01)
*D07B 1/16* (2006.01)

(52) U.S. Cl.
CPC ............ *D07B 1/0613* (2013.01); *B60C 9/005* (2013.01); *D07B 1/0633* (2013.01); *D07B 1/165* (2013.01);
(Continued)

(58) Field of Classification Search
CPC .... B60C 9/005; D07B 1/0613; D07B 1/0633; D07B 1/165; D07B 2201/2046; D07B 2201/2082; D07B 2501/2046
See application file for complete search history.

(56) References Cited

U.S. PATENT DOCUMENTS 7,228,681 B2 * 6/2007 Meersschaut ......... B60C 9/0007
57/213
2010/0170215 A1 7/2010 Nishimura
(Continued)

FOREIGN PATENT DOCUMENTS

| CN | 101802297 A | 8/2010 |
| JP | 56-128384 A | 10/1981 |

(Continued)

OTHER PUBLICATIONS

"Overview of materials for Styrene/Butadiene/Styrene (SBS)", https://www.matweb.com/search/datasheet.aspx?matguid=cdfd0eafc8c2453b8eb1ee3173ac2745&ckck=1, retrieved Apr. 20, 2023 (Year: 2023).*

(Continued)

*Primary Examiner* — Shaun R Hurley
(74) *Attorney, Agent, or Firm* — Sughrue Mion, PLLC

(57) ABSTRACT

Provided is an elastomer reinforcement cord with improved rust inhibition. An elastomer reinforcement cord (10) includes metal filaments and a polymer material. The elastomer reinforcement cord (10) has a multi-strand structure which includes: at least one core strand (21) formed by twisting plural metal filaments (1*a*) and (1*b*) together; and two or more sheath strands (22) each formed by twisting plural metal filaments (11*a*) and (11*b*) together, and in which the sheath strands are twisted together around the core strand. In a region surrounded by a line connecting the centers of the metal filaments constituting the outermost sheath layer of the core strand at a cross-section in a (Continued)

direction orthogonal to an axial direction after vulcanization of the core strand, when a region occupied by other than the metal filaments is defined as a gap region, a filling rate, which is a ratio of the area of the polymer material with respect to the gap region, is 52% to 120%.

13 Claims, 3 Drawing Sheets

(52) U.S. Cl.
CPC .............. *D07B 2201/2046* (2013.01); *D07B 2201/2082* (2013.01); *D07B 2401/204* (2013.01); *D07B 2401/2025* (2013.01); *D07B 2501/2046* (2013.01)

(56) References Cited

U.S. PATENT DOCUMENTS

| | | | |
|---|---|---|---|
| 2010/0257834 A1 | 10/2010 | Baekelandt et al. | |
| 2011/0198008 A1 | 8/2011 | Pottier et al. | |
| 2011/0253280 A1* | 10/2011 | Matsuo | B60C 9/0007 152/526 |
| 2012/0174557 A1 | 7/2012 | Boisseau et al. | |
| 2017/0114496 A1 | 4/2017 | Belin et al. | |
| 2019/0329593 A1 | 10/2019 | Shizuku et al. | |

FOREIGN PATENT DOCUMENTS

| | | |
|---|---|---|
| JP | 60-231884 A | 11/1985 |
| JP | 2009-292400 A | 12/2009 |
| JP | 2012-531540 A | 12/2012 |
| JP | 2015-203157 A | 11/2015 |
| WO | 80/02572 A1 | 11/1980 |
| WO | 2017/222046 A1 | 12/2017 |

OTHER PUBLICATIONS

International Search Report for PCT/JP2019/042420, dated Jan. 28, 2020.

Search Report dated May 6, 2022 from the China National Intellectual Property Administration in CN Application No. 201980071478.4.

Extended European Search Report dated Jul. 28, 2022 in European Application No. 19877949.8.

* cited by examiner

CORD FOR ELASTOMER REINFORCEMENT USE

CROSS REFERENCE TO RELATED APPLICATIONS

This application is a National Stage of International Application No. PCT/JP2019/042420 filed Oct. 29, 2019, claiming priority based on Japanese Patent Application No. 2018-204359 filed Oct. 30, 2018, the contents of all of which are incorporated herein by reference.

TECHNICAL FIELD

The present invention relates to an elastomer reinforcement cord (hereinafter, also simply referred to as "cord"). More particularly, the present invention relates to an elastomer reinforcement cord having a multi-strand structure which exhibits excellent rust inhibition.

BACKGROUND ART

Conventionally, steel cords obtained by twisting plural steel filaments together are used as reinforcing materials in belts and the like of a tire. However, there are small gaps between the steel filaments at cross-sections of these steel cords, and water is sucked up through the gaps by capillary action. Therefore, for example, when the tire is subjected to an external injury and a damage reaching the steel cords is generated, water and the like in the external environment may infiltrate into the gaps between the filaments constituting the steel cords and cause the steel cords to be rusted.

In this respect, conventionally, cords generally called rubber penetration cords in which gaps are formed between steel filaments constituting the outer periphery of a steel cord so as to allow a rubber to infiltrate into the steel cord through the gaps during vulcanization and thereby seal a water pathway have been used. Further, with regard to a cord for which it is difficult to design a structure that is likely to allow infiltration of a rubber such as a layer-strand structure or a multi-strand structure, it has been examined to, for example, seal the water infiltration pathway by allowing a rubber or a resin to infiltrate into the cord in advance at the time of twisting.

As a prior art relating to an improvement of a steel cord used as a tire reinforcing material, for example, Patent Document 1 discloses a pneumatic radial tire in which a steel cord having a (1+N) structure constituted by a single unpreformed core wire and N side wires twisted around the core wire is used as a reinforcing material of tire components, and at least one stripe part extending in a spiral form is processed on the surface of the core wire.

RELATED ART DOCUMENT

Patent Document

[Patent Document 1] JP2009-292400A

SUMMARY OF THE INVENTION

Problems to be Solved by the Invention

In the above-described Patent Document 1, by controlling the average value of the gaps between adjacent side wires to be in a prescribed range and allowing the cord to have a rubber penetration structure in which a rubber can infiltrate to the inside of the cord during vulcanization, whereby the resistance to corrosion propagation is improved. However, although this method is effective for a cord having a simple structure such as a single-strand structure, there is a problem that it is difficult to allow a rubber to infiltrate to the inside of a core strand during vulcanization in a cord having a complex structure such as a multi-strand structure.

In addition, a method of allowing a rubber or a resin to infiltrate into a cord at the time of twisting leads to an increase in the number of steps and thus has a problem of reducing the productivity. Further, when a rubber is allowed to infiltrate into a cord, a long retention period before tire vulcanization causes an excessive reaction at the interface between a steel cord and the rubber, which may deteriorate the adhesion.

Particularly, as a steel cord in a large-sized tire, a multi-strand cord obtained by further twisting plural strands having a layer-strand structure is used; therefore, a rubber is unlikely to infiltrate into such a cord from the outside and, even if the rubber sufficiently infiltrated into the sheath strands on the outer side to seal the water pathway, the rubber cannot infiltrate into the core strand positioned in the center of the cord, as a result of which rust may propagate along the core strand.

In view of the above, an object of the present invention is to provide an elastomer reinforcement cord which has a multi-strand structure including plural metal filaments and exhibits improved rust inhibition.

Means for Solving the Problems

The present inventor intensively studied to discover that the above-described problems can be solved by filling a polymer material into a cord having a multi-strand structure that includes metal filaments and defining the polymer material to have a prescribed filling rate, thereby completing the present invention.

That is, the elastomer reinforcement cord of the present invention is an elastomer reinforcement cord including metal filaments and a polymer material, wherein the elastomer reinforcement cord has a multi-strand structure which includes: at least one core strand formed by twisting plural metal filaments together; and two or more sheath strands each formed by twisting plural metal filaments together, and in which the sheath strands are twisted together around the core strand, and in a region surrounded by a line connecting the centers of the metal filaments constituting the outermost sheath layer of the core strand at a cross-section in a direction orthogonal to an axial direction after vulcanization of the core strand, when a region occupied by other than the metal filaments is defined as a gap region, a filling rate, which is a ratio of the area of the polymer material with respect to the gap region, is 52% to 120%.

In the cord of the present invention, it is preferred that the polymer material have a melting point or softening point of 80° C. to 160° C. In the cord of the present invention, it is also preferred that the polymer material be not contained in the sheath strands.

Further, in the cord of the present invention, it is preferred that a distance between the metal filaments constituting the outermost sheath layer of the core strand be 20 μm or less, and that a distance between the metal filaments constituting the outermost sheath layer of each of the sheath strands be larger than 20 μm. Still further, the elastomer reinforcement cord of the present invention can be formed by twisting the metal filaments with resin filaments containing the polymer material.

Effects of the Invention

According to the present invention, an elastomer reinforcement cord which has a multi-strand structure including plural metal filaments and exhibits improved rust inhibition can be realized.

MODE FOR CARRYING OUT THE INVENTION

Figure 1:
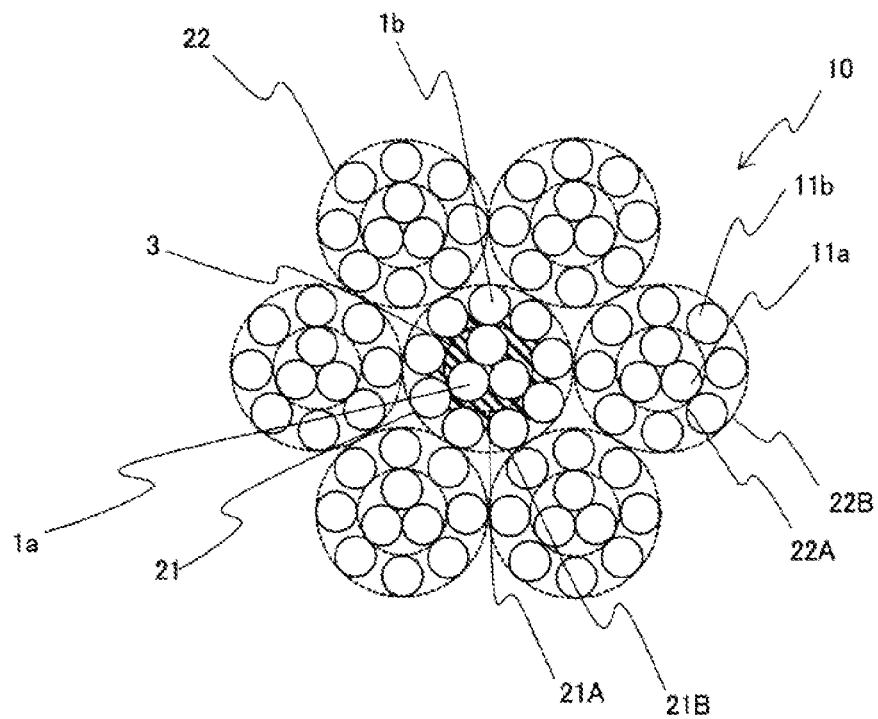
FIG. 1 is a cross-sectional view of an elastomer reinforcement cord according to one preferred embodiment of the present invention in a direction orthogonal to the axial direction after vulcanization.

The present invention will now be described in detail referring to the drawings.

FIG. 1 shows a cross-sectional view of an elastomer reinforcement cord according to one preferred embodiment of the present invention in a direction orthogonal to the axial direction after vulcanization. As illustrated, an elastomer reinforcement cord 10 of the present invention has a multi-strand structure which includes: at least one core strand 21 formed by twisting plural metal filaments 1a and 1b together; and two or more sheath strands 22 each formed by twisting plural metal filaments 11a and 11b together, and in which the sheath strands 22 are twisted together around the core strand 21.

Specifically, the illustrated elastomer reinforcement cord 10 includes: a single core strand 21, which includes a core 21A composed of three metal filaments 1a, and a single sheath layer 21B composed of nine metal filaments 1b; and six sheath strands 22, each of which includes a core 22A composed of three metal filaments 11a, and a single sheath layer 22B composed of eight metal filaments 11b. However, the structure of the cord of the present invention is not restricted to the above-described structure.

Figure 2:
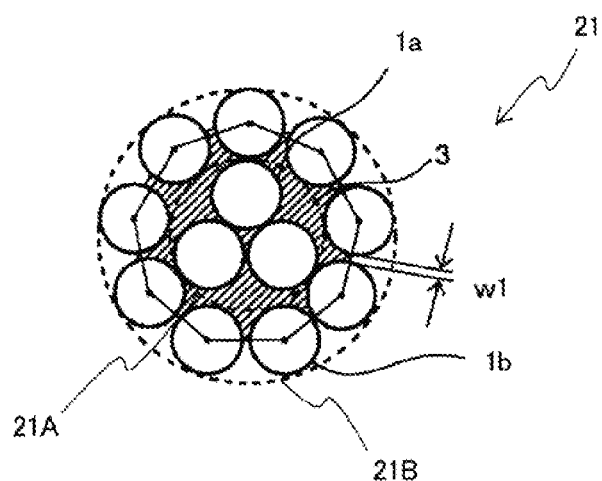
FIG. 2 is an enlarged view of a core strand extracted from FIG. 1.

The elastomer reinforcement cord 10 of the present invention includes: the metal filaments 1a, 1b, 11a and 11b; and a polymer material 3 filled into gaps between these metal filaments. FIG. 2 shows an enlarged view of one core strand 21 extracted from FIG. 1. In the cord 10 of the present invention, as illustrated, in a region surrounded by a line connecting the centers of the metal filaments 1b constituting the outermost sheath layer (the sheath layer 21B in the illustrated example) of the core strand 21 at a cross-section in a direction orthogonal to the axial direction after vulcanization of the core strand 21, when a region occupied by other than the metal filaments 1a and 1b is defined as a gap region, a filling rate, which is a ratio of the area of the polymer material 3 with respect to the gap region, is 52% to 120%.

According to the present invention, in the cord 10, by controlling the filling rate, which is a filling ratio of the polymer material 3 in the region occupied by other than the metal filaments inside the core strand 21, to be 52% to 120%, good rust inhibition can be ensured even when the cord 10 has a multi-strand structure. That is, in the case of a multi-strand cord, even if water pathways in sheath strands are sealed, rust may develop as long as a water pathway in a core strand constituting the cord central part into which a rubber is less likely to infiltrate cannot be sealed. In this respect, in the present invention, it was discovered that rust development along a core strand can be inhibited by filling gaps inside the core strand, into which a rubber is unlikely to infiltrate, with a polymer material, and controlling the filling rate thereof in the above-described range.

In the present invention, when the filling rate is lower than 52%, the gaps inside the core strand cannot be sufficiently filled and, therefore, rusting of the metal filaments 1a and 1b cannot be effectively inhibited. Meanwhile, when the filling rate is higher than 120%, the polymer material leaking out of the core strand reaches the surface layer of a sheath strand and infiltrates to an intrinsic interface forming an adhesive layer with a rubber, and this potentially reduces the strength as an elastomer reinforcement cord; therefore, the expected effects of the present invention cannot be obtained likewise. In the present invention, the filling rate is preferably 60% to 120%.

It is noted here that, in the present invention, a filling rate of higher than 100% means that even the outer side of the gap region in the core strand is filled with the polymer material 3, i.e. those parts of the surfaces of the metal filaments 1b constituting the outermost sheath layer of the core strand 21 that correspond to the cord outer periphery, are coated with the polymer material 3. When there are two or more core strands, the filling rate is determined as an average value of the two or more core strands.

In the present invention, the polymer material 3 may or may not be filled into the sheath strands 22 as long as the polymer material 3 is filled into the core strand 21 at the above-described filling rate. The water pathways inside the sheath strands 22 can be sealed without impregnating a rubber into the sheath strands 22 as long as the polymer material 3 is filled into the sheath strands 22; however, this requires another step for filling the polymer material 3 into the sheath strands 22. Therefore, from the standpoint of the cord productivity, it is preferred that the polymer material 3 be not contained in the sheath strands 22. Even without the polymer material 3 being filled into the sheath strands 22, a rubber can be relatively easily impregnated into the sheath strands 22 even after vulcanization, and the water pathways inside the sheath strands 22 can thereby be sealed; therefore, sufficient rust inhibition and sufficient productivity can both be attained. In addition, there is a benefit that the cord 10 is allowed to have good flexibility by not filling the polymer material 3 into the sheath strands 22.

In the cord 10 of the present invention, after vulcanization, a distance w1 between the metal filaments 1b constituting the outermost sheath layer of the core strand 21 is preferably 20 μm or less. When the distance w1 between the metal filaments 1b constituting the outermost sheath layer is relatively small in this manner, the application of the present invention is particularly useful since a rubber is unlikely to infiltrate into the core strand 21. Particularly, the distance w1 between the metal filaments 1b constituting the outermost sheath layer of the core strand 21 is 5 µm to 18 µm.

Figure 3:
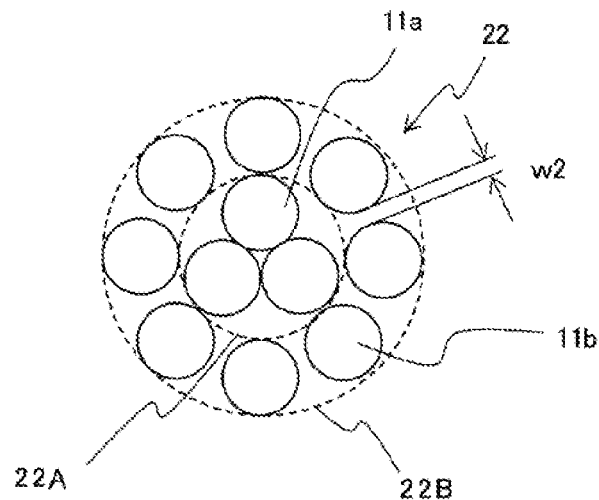
FIG. 3 is an enlarged view of a sheath strand extracted from FIG. 1.

FIG. 3 shows an enlarged view of one sheath strand 22 extracted from FIG. 1. In the cord 10 of the present invention, after vulcanization, a distance w2 between the metal filaments 11b constituting the outermost sheath layer of each sheath strand 22 is preferably larger than 20 µm. By defining the distance w2 between the metal filaments 11b constituting the outermost sheath layer to be relatively large in this manner, a rubber is made likely to infiltrate into each sheath strand 22, which is preferred. Particularly, the distance w2 between the metal filaments 11b constituting the outermost sheath layer of each sheath strand 22 is larger than 20 µm and 50 µm or less.

Figure 4:
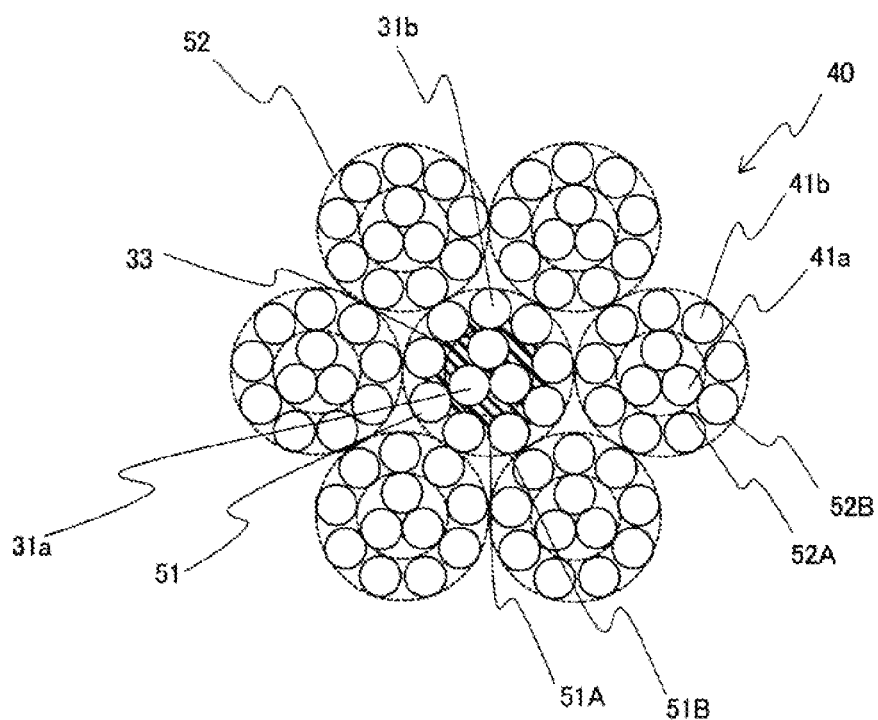
FIG. 4 is a cross-sectional view of an elastomer reinforcement cord according to another preferred embodiment of the present invention in a direction orthogonal to the axial direction after vulcanization.

FIG. 4 shows a cross-sectional view of an elastomer reinforcement cord according to another preferred embodiment of the present invention in a direction orthogonal to the axial direction after vulcanization. For example, in the elastomer reinforcement cord 10 illustrated in FIG. 1, the sheath strands 22 have a rubber penetration structure in which the distance w2 between the metal filaments 11b constituting the outermost sheath layer is ensured to be relatively large and a rubber is thus more likely to infiltrate into the inside; however, in the cord of the present invention, as illustrated in FIG. 4, the sheath strands may have the same cord structure as the core strand. A cord 40 illustrated in FIG. 4 includes: a single core strand 51, which includes a core 51A composed of three metal filaments 31a, and a single sheath layer 51B composed of nine metal filaments 31b; and six sheath strands 52, each of which includes a core 52A composed of three metal filaments 41a, and a single sheath layer 52B composed of nine metal filaments 41b. A polymer material 33 is filled into the core strand 51 at the above-described filling rate.

In the cord 10 of the present invention, it is preferred that, when cross-sections orthogonal to the axial direction are observed at intervals of 2 mm along the cord axial direction over a range of twice the twist pitch of the outermost sheath layer of the core strand 21, voids on the adjacent observed cross-sections be not in communication with each other in the axial direction at three or more spots. In other words, it is preferred that no void be continuous over a length of 6 mm or greater along the cord axial direction in the gap region. When a void is continuous in the gap region, this void acts as a water pathway and causes rust to develop on the metal filaments 1a and 1b. However, in the above-described state, closed systems are formed in the gap region, so that rust development along the axial direction can be effectively inhibited.

As the metal filaments 1a, 1b, 11 a and 11b in the cord 10 of the present invention, generally, metal wires containing steel, namely iron, as a main component (the mass of iron is greater than 50% by mass with respect to a total mass of the metal filaments) can be used. The metal filaments 1a, 1b, 11 a and 11b may consist of only iron, or may contain a metal other than iron, such as zinc, copper, aluminum, or tin. Particularly, steel filaments are used.

In the cord 10 of the present invention, the surfaces of the metal filaments 1a, 1b, 11a and 11b may be treated by plating. The type of the plating is not particularly restricted, and examples thereof include zinc plating, copper plating, brass plating, bronze plating, and ternary alloy plating such as copper-zinc-cobalt plating. Thereamong, brass plating composed of copper and zinc is preferred since brass-plated metal filaments exhibit excellent adhesion with a rubber. In the brass plating, the ratio of copper and zinc (copper:zinc) is usually 60:40 to 70:30 based on mass. The thickness of the resulting plated layer is generally 100 nm to 300 nm.

In the cord 10 of the present invention, the diameter, the tensile strength, and the cross-sectional shape of the metal filaments 1a, 1b, 11a and 11b are not particularly restricted, and may be appropriately selected as desired. For example, the diameter of the metal filaments 1a, 1b, 11a and 11b may be 0.10 mm to 0.60 mm, and it is preferably 0.12 mm to 0.50 mm. By controlling the diameter of the metal filaments 1a, 1b, 11a and 11b to be 0.10 mm or larger, an excessive reduction in the size of the voids inside the cord can be inhibited, and the strength necessary for stable production of resin filaments required for filling can be ensured. On the other hand, an increase in the diameter for the purpose of ensuring such strength poses a concern of adversely affecting the cord twisting properties; therefore, a tensile strength required for the metal filaments 1a, 1b, 11a and 11b can be obtained when the diameter of the metal filaments 1a, 1b, 11a and 11b is 0.60 mm or less, and this is also advantageous from the standpoint of attaining both satisfactory strength and weight reduction.

Figure 5:
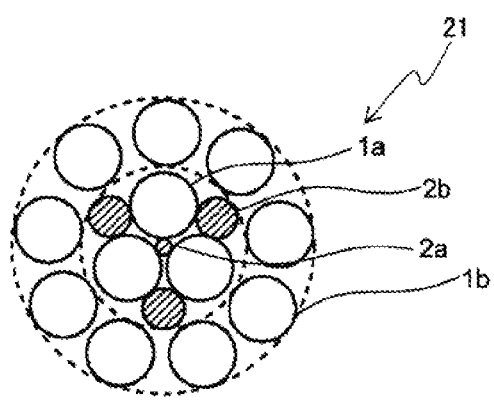
FIG. 5 is a cross-sectional view of one example of the core strand according to the elastomer reinforcement cord of the present invention in a direction orthogonal to the axial direction before vulcanization.

FIG. 5 shows a cross-sectional view of one example of the core strand according to the elastomer reinforcement cord of the present invention in a direction orthogonal to the axial direction before vulcanization. As illustrated, the elastomer reinforcement cord of the present invention can be formed by twisting metal filaments with resin filaments containing a polymer material. More specifically, in the cord 10 of the present invention, at the time of twisting, resin filaments 2a and 2b composed of the polymer material 3 are twisted together along with the metal filaments 1a and 1b to form the core strand 21 having a layer-strand structure, and the resin filaments 2a and 2b are melted by the heat applied during vulcanization, whereby the polymer material 3 is filled into the gap region inside the core strand 21. In cases where the polymer material 3 is to be filled into the sheath strands 22 as well, the sheath strands 22 may be formed in the same manner by twisting resin filaments composed of the polymer material 3 along with the metal filaments 11a and 11b. The strand structure of the metal filaments 1a and 1b and the resin filaments 2a and 2b is not limited to that of the illustrated example as long as the filling rate of the polymer material 3 in the core strand 21 after vulcanization is in the above-described range.

In the cord 10 of the present invention, with regard to the polymer material 3, the melting point when a resin component contained therein is composed of a single resin, or the softening point when the resin component is composed of a composition containing two or more resins, is preferably 80° C. to 160° C., more preferably 130° C. to 160° C. By using the polymer material 3 whose melting point or softening point satisfies this range, the polymer material 3 is melted or softened during vulcanization and thereby made to flow, so that the polymer material 3 can favorably fill the gaps between the metal filaments in the cord. An excessively high melting point or softening point of the polymer material 3 have effects of, for example, making the polymer material 3 unlikely to be melted or softened during vulcanization and deteriorating the molding workability. The term "melting point" used herein refers to a melting peak temperature determined by the heat flux differential scanning calorimetry prescribed in JIS K7121. Further, the term "softening point" used herein refers to a value measured by the softening point test method prescribed in JIS K7206 (1999).

In the present invention, as the polymer material 3, it is preferred to use a polymer material having a melt flow rate (MFR), which is defined by JIS K7210, of 1.0 g/10 min or higher. The use of a polymer material having an MFR of 1.0 g/10 min or higher as the polymer material 3 is preferred since, when the resin filaments 2a and 2b are melted or softened during vulcanization, the polymer material 3 inside the cord can be ensured to have sufficient fluidity and is thus sufficiently filled into the gaps between the metal filaments constituting the cord. The MFR of the polymer material is more preferably 5.0 g/10 min or higher but, for example, 20 g/10 min or lower.

As the resin component of the polymer material 3, specifically, for example, an ionomer or an acid-modified resin can be used, or any combination thereof may be used as well.

Among acid-modified resins, a resin modified with an acid anhydride of dimer acid, maleic acid, itaconic acid or the like is preferred. By incorporating a maleic acid-modified resin into the polymer material 3, the adhesion of the polymer material 3 with the metal filaments can be improved. Examples of the maleic acid-modified resin include maleic anhydride-modified styrene-ethylene-butadiene-styrene block copolymers (SEBS), maleic acid-modified polyethylenes, maleic anhydride-modified ultralow-density polyethylenes, maleic anhydride-modified ethylene-butene-1 copolymers, maleic anhydride-modified ethylene-propylene copolymers, maleic anhydride-modified ethylene-octene, and maleic anhydride-modified propylene, among which a maleic anhydride-modified SEBS is particularly preferred. Specific examples of commercially available products thereof include TUFTEC M1943, M1911 and M1913, which are manufactured by Asahi Kasei Corporation, as well as ADMER LB548, NF518, QF551, QF500 and QE060, HI-WAX 4051E, 4252E and 1105A, and TAFMER MH7010 and MH7020, which are manufactured by Mitsui Chemicals, Inc. These may be used singly, or in combination of two or more thereof.

Specific examples of the ionomer include: zinc ion-neutralized ionomers, such as HIMILAN 1554, HIMILAN 1557, HIMILAN 1650, HIMILAN 1652, HIMILAN 1702, HIMILAN 1706 and HIMILAN 1855, as well as sodium ion-neutralized ionomers, such as HIMILAN 1555, HIMILAN 1601, HIMILAN 1605, HIMILAN 1707, HIMILAN 1856 and AM7331, all of which are manufactured by Dow-Mitsui Polychemicals Co., Ltd.; and lithium ion-neutralized ionomers such as SURLYN 7930, and sodium ion-neutralized ionomers such as SURLYN 8120, which are manufactured by DuPont Co., Ltd. These ionomers may be used singly, or in combination of two or more thereof.

As the resin component of the polymer material 3, in order to prevent the formation of a water infiltration pathway that is caused by detachment of the polymer material 3 and the metal filaments at their interface after vulcanization, it is preferred to use a resin having good adhesion with the interface of the metal filaments, particularly steel filaments. Further, similarly, in order to prevent the formation of a water infiltration pathway that is caused by detachment of the polymer material 3 and an elastomer in contact therewith, such as a rubber, at their interface, it is preferred to use a resin having good compatibility with the elastomer. Moreover, in the present invention, in order to ensure lubricity at the time of twisting metal filaments and resin filaments, it is desired to keep the surfaces of the resin filaments in a smooth state.

In the present invention, the resin component of the polymer material 3 preferably contains an ionomer. By incorporating an ionomer into the polymer material 3, the surfaces of the resin filaments 2a and 2b are smoothened, so that not only the spinnability can be improved but also the lubricity of the resin filaments in a twisting machine can be improved. Specifically, a smooth filament surface can be obtained by using an ionomer singly or blending an appropriate amount of a resin having an effect of improving the surface texture, such as an ionomer, with a maleic acid-modified SEBS as a base.

In cases where a combination of an acid-modified resin and an ionomer is used as the resin component of the polymer material 3, in order to obtain the effects of both of these materials in a balanced manner, the mass ratio of the acid-modified resin and the ionomer is preferably in a range of 1:9 to 9:1 and, taking into consideration the balance of various performance, it is more preferably in a range of 4:6 to 6:4. It is particularly preferred to use the polymer material 3 in which the resin component contains an ionomer at a ratio of 30% by mass to 50% by mass with respect to a total amount of a maleic acid-modified SEBS and the ionomer.

Further, in order to facilitate vulcanization adhesion at the interface between the polymer material 3 and an elastomer during vulcanization, it is preferred to set the neutralization degree of the ionomer to be high in the above-described blending such that the ionomer does not inhibit vulcanization as the alkaline side.

As the resin component of the polymer material 3, for example, "NUCREL" Series and "ELVALOY" Series, which are manufactured by Dow-Mitsui Polychemicals Co., Ltd.; "MODIC" Series manufactured by Mitsubishi Chemical Corporation; "OREVAC" Series, "BONDINE" Series and "LOTRYL" Series, which are manufactured by Arkema K.K.; "REXPEARL" Series manufactured by Japan Polyethylene Corporation; "ACRYFT" Series manufactured by Sumitomo Chemical Co., Ltd.; fluorine-based ionomers manufactured by Asahi Kasei Corporation; and ethylene-ethyl acrylate copolymers manufactured by NUC Corporation can also be used. These resin components may be used singly, or in combination of two or more thereof.

In the present invention, the polymer material 3 may also contain an inorganic filler. As described above, since the resin filaments 2a and 2b are required to be easily melted or softened at a vulcanization temperature, the melting point or softening point thereof is preferably 160° C. or lower. However, when the melting point or softening point of the resin is low, the strength of the resin filaments 2a and 2b is reduced and, therefore, the productivity may be deteriorated due to breakage of the resin filaments during twisting. Accordingly, in the cord 10 of the present invention, the strength of the resin filaments 2a and 2b may be improved by adding an inorganic filler to the polymer material 3. By adding an inorganic filler to the polymer material 3, the surface tackiness of the resin filaments 2a and 2b is reduced, so that the lubricity of the resin filaments 2a and 2b is further improved, and this also has a benefit that twisting of the cord is made easier.

The amount of the inorganic filler to be added is preferably 0.1 parts by mass to 30 parts by mass, more preferably 0.5 parts by mass to 30 parts by mass, still more preferably 5 parts by mass to 30 parts by mass, particularly preferably 10 parts by mass to 20 parts by mass, with respect to 100 parts by mass of the resin component contained in the polymer material 3. When the amount of the inorganic filler is 0.1 parts by mass or greater with respect to 100 parts by mass of the resin component, the effect of reinforcing the resin filaments 2a and 2b is sufficiently obtained. Meanwhile, by controlling the amount of the inorganic filler to be 30 parts by mass or less, not only saturation of the effect of reinforcing the resin filaments 2a and 2b is inhibited, which is preferred from the cost standpoint as well, but also sufficient dispersibility of the inorganic filler can be ensured and the durability of the resin filaments 2*a* and 2*b* can be improved at the same time.

Examples of the inorganic filler include carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, and barium sulfate. These inorganic fillers may be used singly, or in combination of two or more thereof. Thereamong, a carbon black is preferred from the standpoint of reinforcing the resin filaments 2*a* and 2*b*. It is noted here that rubber compositions constituting tires usually contain a carbon black. Accordingly, when the cord 10 of the present invention is applied to a tire, the use of a carbon black in the resin filaments 2*a* and 2*b* according to the cord 10 of the present invention improves the compatibility between the resin filaments 2*a* and 2*b* and a rubber composition constituting the tire; therefore, the adhesion between a rubber and the polymer material is expected to be improved as well.

When a carbon black is used, the grade thereof is not particularly restricted, and any carbon black may be selected as appropriate. Examples thereof include SRF, GPF, FEF, HAF, ISAF, and SAF. Particularly, for example, FEF, HAF, ISAF and SAF, which have excellent bending resistance and fracture resistance, can be preferably used, and the carbon black has a nitrogen adsorption specific surface area $N_2SA$ (according to JIS 1(6217-2:2001) of preferably 30 $m^2/g$ to 150 $m^2/g$, more preferably 35 $m^2/g$ to 130 $m^2/g$.

The polymer material 3 may also contain a thermoplastic resin and/or a thermoplastic elastomer to such an extent that does not hinder the effects of the present invention. Further, a variety of additives, such as an age resistor, an oil, a plasticizer, a color former and a weather resistant agent, may be incorporated (blended) into the polymer material 3.

The resin filaments 2*a* and 2*b* can be produced by a known method using the polymer material 3, and the production method is not particularly restricted. For example, the resin filaments 2*a* and 2*b* can be produced by kneading the resin component and the like constituting the polymer material 3, and subsequently drawing the resulting resin composition. Further, when an inorganic filler is added to the polymer material 3, a large amount of the inorganic filler is added to the resin component to produce a masterbatch in advance, and the resin filaments 2*a* and 2*b* can be produced by adding this masterbatch to the resin component to prepare a resin composition containing the inorganic filler in a prescribed amount, and subsequently drawing the thus obtained resin composition.

In the present invention, the resin filaments 2*a* and 2*b* preferably have a diameter of 0.1 mm or larger. By controlling the diameter of the resin filaments 2*a* and 2*b* to be 0.1 mm or larger, the resin filaments 2*a* and 2*b* are made unlikely to be broken when twisted together with the metal filaments 1*a*, 1*b*, 11*a* and 11*b*, and this makes it easier to produce a cord having a desired structure. An upper limit of the diameter of the resin filaments 2*a* and 2*b* is not particularly restricted, and can be set as appropriate such that the condition of the filling rate after vulcanization is satisfied.

The structure of the cord 10 of the present invention is not particularly restricted as long as the cord 10 of the present invention has a multi-strand structure which includes one or more, for example, one to three core strands 21, and two or more, for example, two to fifteen sheath strands 22, and in which the sheath strands 22 are twisted together around the core strand(s) 21. The cord 10 of the present invention may have specifically, for example, a multi-strand structure in which the core strand(s) and sheath strands each having an (N+M) structure of (1+6), (2+6), (2+8), (3+8), (3+9) or the like, an (N+M+L) structure of (3+9+15), (1+6+11) or the like, or a compact structure of (1+6), (2+8), (3+9), (1+6+12) or the like, are further twisted together after vulcanization. In the present invention, the metal filaments constituting the respective strands may have the same diameter or different diameters, and the core strand(s) and the sheath strands may have the same structure or different structures.

Among the above-described structures, particularly, a cord in which the core strand 21 has a layer-strand structure constituted by a core and at least one sheath layer and the core of the core strand is formed by twisting three metal filaments together has a structure that is unlikely to allow an elastomer to infiltrate into the voids inside the core; however, in the present invention, by arranging the resin filaments 2*a* in the core as illustrated in FIG. 5, the void in the center of the core can be easily filled with the polymer material 3 after vulcanization. Therefore, the application of the present invention is particularly useful for such a cord having a structure in which the core of the core strand is formed by twisting three metal filaments together.

As described above, the cord 10 of the present invention can be obtained by twisting the metal filaments 1*a*, 1*b*, 11*a* and 11*b* with the resin filaments 2*a* and 2*b*, subsequently bringing the resin filaments 2*a* and 2*b* into a flowable state by heating, and then filling the gaps between the metal filaments 1*a*, 1*b*, 11*a* and 11*b* with the polymer material 3. With regard to the arrangement positions of the resin filaments at the time of twisting the metal filaments with the resin filaments, there is no particular restriction as long as the gaps between the metal filaments can be appropriately filled with the polymer material by heating and the condition of the filling rate after vulcanization can be satisfied.

Because of the improved strength of the resin filaments 2*a* and 2*b*, the cord 10 of the present invention can be produced by twisting the resin filaments 2*a* and 2*b* together simultaneously with ordinary cord twisting, using a twisting machine or the like that is generally used for the production of a tire steel cord. Therefore, there is no increase in the operation steps, and the productivity is not deteriorated. From the standpoint of inhibiting twist breakage caused by the difference in material between the metal filaments 1*a*, 1*b*, 11*a* and 11*b* and the resin filaments 2*a* and 2*b*, it is preferred to use a resin material having the highest strength possible for the resin filaments 2*a* and 2*b*. Preferably, the resin material has a Rockwell hardness (H scale) of 30 to 150. When the Rockwell hardness is 150 or lower, plastic working of the resin filaments 2*a* and 2*b* can be performed easily, and the cord twisting properties are improved. The strength of the resin filaments 2*a* and 2*b* can be improved by increasing the draw ratio in the production of the resin filaments 2*a* and 2*b*. Further, the resin filaments 2*a* and 2*b* preferably have good lubricity in the twisting machine.

The cord 10 of the present invention exhibits excellent adhesion with an elastomer such as a rubber and, therefore, can be preferably used in those parts where a steel cord-rubber complex is conventionally used. Particularly, the cord 10 of the present invention can be preferably used as a reinforcing material of a rubber article, such as a tire, a belt, or a hose. Specific examples of the tire include tires for passenger vehicles, and tires for trucks and buses. A part to which the cord 10 of the present invention is applied is also not particularly restricted, and the cord 10 of the present invention can be used as a carcass ply reinforcing material or a belt reinforcing material. In this case, the cord 10 of the present invention can be used only for local reinforcement of a portion of a tread. The cord 10 of the present invention can also be used only for local reinforcement of, for example, the vicinity of a tread edge, the vicinity of the equatorial plane, the vicinity of groove bottoms or, when other inclined belt layer or circumferential cord layer is included, an end thereof.

The elastomer used for coating the cord 10 of the present invention is also not particularly restricted and, for example, any rubber that is conventionally used for coating a metal cord can be used. In addition, examples of an elastomer that can be preferably used include: diene-based rubbers and hydrogenation products thereof, such as natural rubbers (NR), isoprene rubbers (IR), epoxidized natural rubbers, styrene-butadiene rubbers (SBR), butadiene rubbers (BR, high-cis BR and low-cis BR), nitrile rubbers (NBR), hydrogenated NBRs, and hydrogenated SBRs; olefin-based rubbers, such as ethylene-propylene rubbers (EPDM and EPM), maleic acid-modified ethylene-propylene rubbers (M-EPM), butyl rubbers (IIR), copolymers of isobutylene and an aromatic vinyl or diene monomer, acrylic rubbers (ACM), and ionomers; halogen-containing rubbers, such as Br-IIR, Cl-IIR, brominated isobutylene-p-methylstyrene copolymers (Br-IPMS), chloroprene rubbers (CR), hydrin rubbers (CHR), chlorosulfonated polyethylene rubbers (CSM), chlorinated polyethylene rubbers (CM), and maleic acid-modified chlorinated polyethylene rubbers (M-CM); silicone rubbers, such as methyl vinyl silicone rubber, dimethyl silicone rubber, and methylphenyl vinyl silicone rubber; sulfur-containing rubbers, such as polysulfide rubbers; fluororubbers, such as vinylidene fluoride-based rubbers, fluorine-containing vinyl ether-based rubbers, tetrafluoroethylene-propylene-based rubbers, fluorine-containing silicone-based rubbers, and fluorine-containing phosphazene-based rubbers; and thermoplastic elastomers, such as styrene-based elastomers, olefin-based elastomers, ester-based elastomers, urethane-based elastomers, and polyamide-based elastomers. These elastomers may be used singly, or in combination of two or more thereof by mixing.

EXAMPLES

The present invention will now be described in more detail by way of Examples thereof.

Core strands of Examples 1 and 2 which had a (3+9) structure in their steel parts are produced by twisting steel filaments of 0.34 mm in diameter with resin filaments, and a core strand of Comparative Example 1 which has a (3+9) structure in its steel part is produced in the same manner, except that the resin filaments are not used. Further, sheath strands of Examples 1 and 2 and Comparative Example 1, which have a (3+8) structure or a (3+9) structure in their steel parts, are each produced by twisting steel filaments of 0.34 mm in diameter together. Using the thus obtained strands, unvulcanized cords having a multi-strand structure in which six sheath strands are twisted together around a single core strand are obtained in accordance with the respective conditions shown in Table below. The diameter of the resin filaments is selected in accordance with the respective conditions shown in Table below.

The resin filaments are prepared from a polymer material (softening point: 110° C.) that is obtained by mixing TUFTEC M1943 manufactured by Asahi Kasei Corporation (softening point: 39° C., MFR: 8 g/10 min (JIS K7210)) as a maleic anhydride-modified SEBS with HIMILAN 1702 manufactured by Dow-Mitsui Polychemicals Co., Ltd. (melting point: 90° C.) as an ionomer at a ratio of 8:2.

The thus obtained unvulcanized cords are each coated with a coating rubber to produce cord-rubber complexes, and these complexes are vulcanized at 145° C. for 40 minutes with a pressure equivalent to the pressure applied during tire vulcanization being applied thereto. The surface of a rubber-attached cord cut out from each of the thus vulcanized cord-rubber complexes is coated with a silicone sealant and then dried, and both ends of this cord is subsequently cut to obtain a sample length of 100 mm, after which one end of the cord is sealed with a resin, while the other end is immersed in a 5%-by-mass aqueous sodium hydroxide (NaOH) solution for 24 hours. Thereafter, the cord is taken out of the aqueous solution, and the liquid propagation length from the cord end is measured. This measurement is performed for 10 to 30 cords (N=10 to 30), and an average value thereof is determined as an index of rust inhibition. The results thereof are shown in Table below where largely improved rust inhibition, improved rust inhibition, equivalent rust inhibition, and deteriorated rust inhibition are indicated as "⊚", "○", "Δ" and "x", respectively, based on Comparative Example 1.

It is noted here that, after the vulcanization, the distance between the metal filaments constituting the outermost sheath layers of the strands having a (3+9) structure is 8 μm, and the distance between the metal filaments constituting the outermost sheath layers of the strands having a (3+8) structure is 24 μm.

TABLE 1

| | | Comparative Example 1 | Example 1 | Example 2 |
|---|---|---|---|---|
| Core strand | Structure | 3 + 9 | 3 + 9 | 3 + 9 |
| | Filling rate (%)*1 | — | 120 | 120 |
| Sheath strand | Structure | 3 + 9 | 3 + 8 | 3 + 9 |
| | Filling rate (%)*1 | — | 0 | 0 |
| Rust resistance | | standard | ⊚ | ○ |

*1In a region surrounded by a line connecting the centers of the metal filaments constituting the outermost sheath layer of each strand at a cross-section in a direction orthogonal to the axial direction after vulcanization of the strand, when a region occupied by other than the metal filaments is defined as a gap region, this value is a ratio of the area of the polymer material with respect to the gap region.

In the cord of Comparative Example 1, due to the presence of gaps that are not filled with a rubber at a cross-section of the cord, rust development is likely to progress using the gaps inside the core strand as nuclei. In the cord of Example 1, the gap region in the core strand is filled with the polymer material, and the gap regions in the sheath strands are filled with a rubber, so that rust development is sufficiently inhibited. In the cord of Example 2, the gap region in the core strand is filled with the polymer material, and the majority of the gap regions in the sheath strands are filled with a rubber, so that rust development is inhibited. Therefore, it is seen that an elastomer reinforcement cord with improved rust inhibition can be obtained by filling a polymer material into a core strand such that the range of the filling rate according to the present invention is satisfied.

DESCRIPTION OF SYMBOLS 1a, 1b, 11a, 11b, 31a, 31b, 41a, 41b: metal filament
2a, 2b: resin filament
3, 33: polymer material
10, 40: elastomer reinforcement cord
21, 51: core strand
21A, 22A, 51A, 52A: core
22, 52: sheath strand
21B, 22B, 51B, 52B: sheath layer

The invention claimed is:

1. An elastomer reinforcement cord, comprising metal filaments and a polymer material,
wherein
the elastomer reinforcement cord has a multi-strand structure which comprises: at least one core strand formed by twisting plural metal filaments together; and two or more sheath strands each formed by twisting plural metal filaments together, and in which the sheath strands are twisted together around the core strand, and
in a region surrounded by a line connecting the centers of the metal filaments constituting the outermost sheath layer of the core strand at a cross-section in a direction orthogonal to an axial direction after vulcanization of the core strand, when a region occupied by other than the metal filaments is defined as a gap region, a filling rate, which is a ratio of the area of the polymer material with respect to the gap region, is 52% to 120%, and
wherein a distance between the metal filaments constituting the outermost sheath layer of the core strand is 20 μm or less.

2. The elastomer reinforcement cord according to claim 1, wherein the polymer material has a melting point or softening point of 80° C. to 160° C.

3. The elastomer reinforcement cord according to claim 2, wherein the polymer material is not contained in the sheath strands.

4. The elastomer reinforcement cord according to claim 3, wherein a distance between the metal filaments constituting the outermost sheath layer of each of the sheath strands is larger than 20 μm.

5. The elastomer reinforcement cord according to claim 3, which is formed by twisting the metal filaments with resin filaments containing the polymer material.

6. The elastomer reinforcement cord according to claim 2, wherein a distance between the metal filaments constituting the outermost sheath layer of each of the sheath strands is larger than 20 μm.

7. The elastomer reinforcement cord according to claim 2, which is formed by twisting the metal filaments with resin filaments containing the polymer material.

8. The elastomer reinforcement cord according to claim 1, wherein the polymer material is not contained in the sheath strands.

9. The elastomer reinforcement cord according to claim 8, wherein a distance between the metal filaments constituting the outermost sheath layer of each of the sheath strands is larger than 20 μm.

10. The elastomer reinforcement cord according to claim 8, which is formed by twisting the metal filaments with resin filaments containing the polymer material.

11. The elastomer reinforcement cord according to claim 1, wherein a distance between the metal filaments constituting the outermost sheath layer of each of the sheath strands is larger than 20 μm.

12. The elastomer reinforcement cord according to claim 11, which is formed by twisting the metal filaments with resin filaments containing the polymer material.

13. The elastomer reinforcement cord according to claim 1, which is formed by twisting the metal filaments with resin filaments containing the polymer material.

* * * * *